(12) United States Patent
Sadasivan et al.

(10) Patent No.: US 10,031,306 B2
(45) Date of Patent: Jul. 24, 2018

(54) FIBER DISTRIBUTION ASSEMBLIES

(71) Applicant: Opterna Technology Limited, Limerick (IE)

(72) Inventors: Subin Panakkal Sadasivan, Kochi (IN); Derek Furtado, Kochi (IN); Icy Kollielil Varghese, Kochi (IN); Ravindra K. Vora, Freehold, NJ (US)

(73) Assignee: Opterna Technology Limited, Limerick (IE)

( * ) Notice: Subject to any disclaimer, the term of this patent is extended or adjusted under 35 U.S.C. 154(b) by 89 days.

(21) Appl. No.: 14/633,599

(22) Filed: Feb. 27, 2015

(65) Prior Publication Data

US 2016/0252694 A1 Sep. 1, 2016

(51) Int. Cl.
*G02B 6/00* (2006.01)
*G02B 6/44* (2006.01)

(52) U.S. Cl.
CPC ........... *G02B 6/4446* (2013.01); *G02B 6/445* (2013.01); *G02B 6/4453* (2013.01); *G02B 6/4457* (2013.01)

(58) Field of Classification Search
CPC .. G02B 6/4452; G02B 6/4455; G02B 6/4453; G02B 6/4446; G02B 6/4457; G02B 6/445; G02B 6/4442; G02B 6/4444
USPC .................................................. 385/134–137
See application file for complete search history.

(56) References Cited

U.S. PATENT DOCUMENTS

| 7,522,805 | B2 | 4/2009 | Smith et al. |
| 7,751,672 | B2 | 7/2010 | Smith et al. |
| 7,831,125 | B2 | 11/2010 | Smith et al. |
| 7,873,255 | B2 | 1/2011 | Reagan et al. |
| 8,032,002 | B2 | 10/2011 | Tang et al. |
| 8,229,265 | B2 | 7/2012 | Solheid et al. |
| 8,509,586 | B2 | 8/2013 | Adomeit et al. |
| 8,746,466 | B2 | 6/2014 | Taylor |
| 2008/0112681 | A1* | 5/2008 | Battey ............... G02B 6/445 385/135 |
| 2009/0110359 | A1* | 4/2009 | Smith ............... G02B 6/445 385/135 |
| 2009/0263096 | A1* | 10/2009 | Solheid ............... G02B 6/483 385/135 |

(Continued)

FOREIGN PATENT DOCUMENTS

WO    WO2011/009060 A2    1/2011

OTHER PUBLICATIONS

International Search Report and Written Opinion, Intl. Appl. No. PCT/IB2016/051018, European Patent Office, dated May 2, 2016.

*Primary Examiner* — Kaveh C Kianni
*Assistant Examiner* — Hung Lam
(74) *Attorney, Agent, or Firm* — Sterne, Kessler, Goldstein & Fox P.L.L.C.

(57) ABSTRACT

A fiber distribution assembly includes an enclosure defining an interior cavity. The enclosure includes a base defining a first opening and a second opening, and a cover rotatably coupled to the base and configured to rotate about an axis. The base is symmetric about a line perpendicular to the axis. The first opening is on one side of the line, and the second opening is on the other side of the line. The fiber distribution assembly also includes a tray rotatably coupled to the enclosure within the interior cavity of the enclosure and that is symmetric about the line. The fiber distribution assembly also includes a cable management or fiber optic component configured to be releasably coupled to the tray.

24 Claims, 11 Drawing Sheets

(56) References Cited

U.S. PATENT DOCUMENTS

| | | | |
|---|---|---|---|
| 2009/0290842 A1* | 11/2009 | Bran de Leon | G02B 6/4455 385/135 |
| 2010/0189404 A1 | 7/2010 | Rudenick et al. | |
| 2011/0317974 A1* | 12/2011 | Krampotich | G02B 6/4452 385/135 |
| 2013/0034333 A1* | 2/2013 | Holmberg | G02B 6/445 385/135 |
| 2014/0219622 A1* | 8/2014 | Coan | G02B 6/445 385/135 |
| 2014/0314384 A1* | 10/2014 | Nair | G02B 6/4441 385/135 |

* cited by examiner

FIBER DISTRIBUTION ASSEMBLIES

BACKGROUND

Field

This disclosure relates to optical communication networks and, particularly, relates to fiber distribution assemblies for use in optical communication networks for providing fiber to a subscriber at a location (FTTx networks).

Background Art

There are many types of FTTx networks. For example, FTTx networks include fiber to the curb (FTTC) networks, fiber to the premises (FTTP) networks, fiber to the business (FTTB) networks, and fiber to the antenna (FTTA) networks. The required cable management components, for example, cable management spools and cable guides, and fiber optic components, for example, adapter plates, splitters, and splice cassettes, depend on the particular FTTx network application. These cable management components and fiber optic components are typically housed within an enclosure. The particular configuration of these cable management components and fiber optic components within the enclosure can vary greatly depending on the required components and the physical location at which the components are being deployed. For example, some applications require top cable access to the enclosure, while other application may require bottom cable access to the enclosure. And other applications may require both top and bottom cable access to the enclosure. Further, some physical locations may require that the enclosure's cover swing in a particular direction. Within the enclosure, the cable management components and the optical components must be configured a certain way to accommodate such design requirements and to minimize any bend loss.

Accordingly, there is a need for a fiber distribution assembly that allows the cable management components and the fiber optic components within the enclosure to be easily configured depending on the particular application such that the same fiber distribution assembly can be used in a variety of FTTx applications.

BRIEF SUMMARY

In some embodiments, a fiber distribution assembly includes an enclosure defining an interior cavity. The enclosure includes a base defining a first opening and a second opening, and a cover rotatably coupled to the base and configured to rotate about an axis. The base is symmetric about a line perpendicular to the axis. The first opening is on one side of the line, and the second opening is on the other side of the line. The fiber distribution assembly also includes a tray rotatably coupled to the enclosure within the interior cavity of the enclosure and that is symmetric about the line. The fiber distribution assembly also includes a cable management or fiber optic component configured to be releasably coupled to the tray.

In some embodiments, the fiber distribution assembly includes a solid gland configured to selectively seal the first opening and the second opening, and a gland configured to pass a fiber optic cable and to selectively seal the first opening and the second opening. In some embodiments, the gland configured to pass the fiber optic cable is further configured to pass a plurality of fiber optic cables. In some embodiments, fiber distribution assembly also includes a gland configured to pass only a single fiber optic cable and to selectively seal the first opening and the second opening.

In some embodiments, the base further defines a plurality of first openings and a plurality of second openings. The fiber distribution assembly also includes a plurality of solid glands each configured to selectively seal one of the plurality of first openings and one of the plurality of second openings, and a plurality of glands each configured to a pass fiber optic cable and to selectively seal one of the plurality of first openings and one of the plurality of second openings.

In some embodiments, the cable management or fiber optic component includes at least one of a cable management spool, a cable guide, a splitter holder, and an adapter plate. In some embodiments, fiber distribution assembly includes a plurality of cable management or fiber optic components configured to be releasably coupled to the tray.

In some embodiments, the tray includes a panel defining a plurality of uniformly spaced openings. In some embodiments, each of the plurality of cable management or fiber optic components can include a base that is configured to be coupled adjacent to the panel of the tray and defines a plurality of openings spaced to match the spacing of the plurality of uniformly spaced openings of the panel of the tray. The fiber distribution assembly can also include a plurality of fasteners configured to pass through the plurality of openings of the plurality of cable management or fiber optic components and operatively engage respective openings of the plurality of uniformly spaced openings of the panel of the tray. The fasteners releasably couple the plurality of cable management or fiber optic components to the tray. In some embodiments, each of the plurality of cable management or fiber optic components includes a base configured to be coupled adjacent to the panel of the tray and a plurality of interference fit pins extending from the base and spaced to match the spacing of the plurality of uniformly spaced openings of the panel of the tray. The interference fit pins are configured to operatively engage respective openings of the plurality of uniformly spaced openings of the panel of the tray to create an interference fit. This interference fit releasably couples the plurality of cable management or fiber optic components to the tray. In some embodiments, the plurality of uniformly spaced openings of the panel of the tray form a two-dimensional grid pattern.

In some embodiments, the base includes a main panel, opposing first and second side walls extending from the main panel, and opposing third and fourth side walls extending from the base panel between the first and second side walls. The first wall defines the first opening, and the second wall defines the second opening.

In some embodiments, a fiber distribution assembly includes an enclosure defining an interior cavity. The fiber distribution assembly also includes a tray rotatably coupled to the enclosure within the interior cavity of the enclosure and that includes a panel defining a plurality of uniformly spaced openings. The fiber distribution assembly also includes a plurality of cable management or fiber optic components. Each of the plurality of cable management or fiber optic components includes a base configured to be coupled adjacent to the panel of the tray and defines a plurality of openings spaced to match the spacing of the plurality of uniformly spaced openings of the panel of the tray. The fiber distribution assembly also includes a plurality of fasteners configured to pass through the plurality of openings of the plurality of cable management or fiber optic components and operatively engage respective openings of the plurality of uniformly spaced openings of the panel of the tray. The fasteners releasably couple the plurality of cable management or fiber optic components to the tray. In some embodiments, the plurality of uniformly spaced openings of the tray form a two-dimensional grid pattern. In some embodiments, the plurality of cable management or fiber optic components include at least one of a cable management spool, a cable guide, a splitter holder, and an adapter plate. In some embodiments, the enclosure includes a base and a cover rotatably coupled the base that rotates about an axis. The base and the tray are symmetric about a line perpendicular to the axis.

In some embodiments, a fiber distribution assembly includes an enclosure defining an interior cavity. The fiber distribution assembly also includes a tray rotatably coupled to the enclosure within the interior cavity of the enclosure and that includes a panel defining a plurality of uniformly spaced openings. The fiber distribution assembly also includes a plurality of cable management or fiber optic components. Each component comprising a base configured to be coupled adjacent to the panel of the tray and a plurality of interference fit pins extending from the base and spaced to match the spacing of the plurality of uniformly spaced openings of the panel of the tray. The interference fit pins are configured to operatively engage respective openings of the plurality of uniformly spaced openings of the panel of the tray to create an interference fit that releasably couples the plurality of cable management or fiber optic components to the tray. In some embodiments, the plurality of uniformly spaced openings of the tray form a two-dimensional grid pattern. In some embodiments, the plurality of cable management or fiber optic components includes at least one of a cable management spool, a cable guide, a splitter holder, and an adapter plate. In some embodiments, the enclosure includes a base and a cover rotatably coupled the base that rotates about an axis. The base and the tray are symmetric about a line perpendicular to the axis.

BRIEF DESCRIPTION OF THE DRAWINGS

The accompanying drawings, which are incorporated herein and form part of the specification, illustrate the embodiments and, together with the description, further serve to explain the principles of the embodiments and to enable a person skilled in the relevant art(s) to make and use the embodiments.

Figure 1:
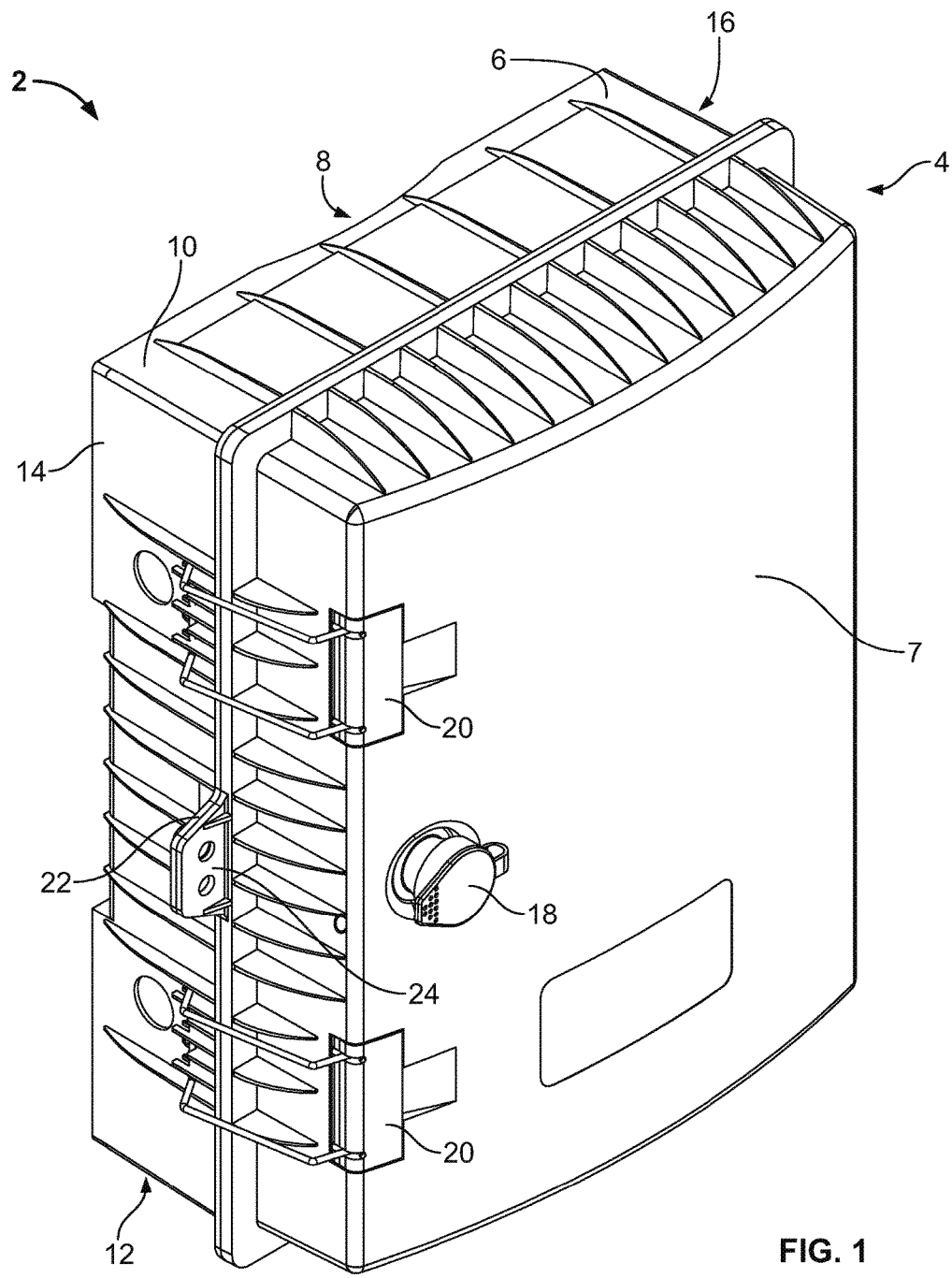
FIG. 1 is a perspective view of a fiber distribution assembly according to an embodiment.

The features and advantages of the embodiments will become more apparent from the detailed description set forth below when taken in conjunction with the drawings.

DETAILED DESCRIPTION

Embodiments will now be described in detail with reference to embodiments thereof as illustrated in the accompanying drawings, in which like reference numerals are used to indicate identical or functionally similar elements. References to "embodiments" or an "embodiment" indicate that the embodiment(s) described may include a particular feature, structure, or characteristic, but every embodiment may not necessarily include the particular feature, structure, or characteristic. Moreover, descriptions of embodiments do not necessarily refer to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In some embodiments, a fiber distribution assembly includes an enclosure defining an interior cavity, a tray rotatably coupled to the enclosure within the interior cavity, and at least one cable management or fiber optic component configured to be releasably coupled to the tray. For example, FIGS. 1-12 illustrate a fiber distribution assembly 2 according to an embodiment.

Enclosure

Referring to FIG. 1, fiber distribution assembly 2 can include an enclosure 4 that defines an interior cavity suitable for storing one or more cable management or fiber optic components, which are described in more detail below. In some embodiments, the interior cavity of enclosure 4 has a volume that ranges from about 15,000 cm$^3$ to about 25,000 cm$^3$. In other embodiments, the interior cavity has a volume less than about 15,000 cm$^3$, or more than about 25,000 cm$^3$. In some embodiments, enclosure 4 has a height that ranges from about 30 cm to about 50 cm, a width that ranges from about 20 cm to about 40 cm, and a depth that ranges from about 10 cm to about 20 cm. In other embodiments, enclosure 4 can have dimensions outside of these recited ranges. Enclosure 4 can be configured such that the interior cavity is environmentally sealed from the surrounding atmosphere to protect the cable management or fiber optic components stored within the interior cavity. Enclosure 4 can be made of, for example, plastic, metal, or any other suitable material. Enclosure 4 can be configured for indoor or outdoor use.

Referring collectively to FIGS. 1-5, enclosure 4 includes a base 6 and a cover 7 rotatably coupled to base 6. Base 6 can be configured to be mounted to a surface, for example, a wall, enclosure, pole, or any other desired mounting surface. Base 6 can, in some embodiments, include a bracket assembly for mounting enclosure 4 to the mounting surface. Cover 7 is configured to rotate, about an axis of rotation, between a closed position as shown in FIG. 1 and an opened position as shown in FIGS. 2-5. At the closed position, cover 7 engages base 6 and substantially seals the interior cavity of enclosure 4. At the opened position, the interior cavity of enclosure 4 is opened, and a user has access to the internal structure of enclosure 4 as well as the cable management or fiber optic components stored within enclosure 4. In some embodiments as shown in FIGS. 2-6, cover 7 is rotatably coupled to base 6 using a hinge 30 that defines the axis of rotation. Hinge 30 can be formed, at least in part, by integral portions of base 6 and cover 7. In other embodiments, hinge 30 can be a separate component coupled to base 6 and cover 7.

Figure 2:
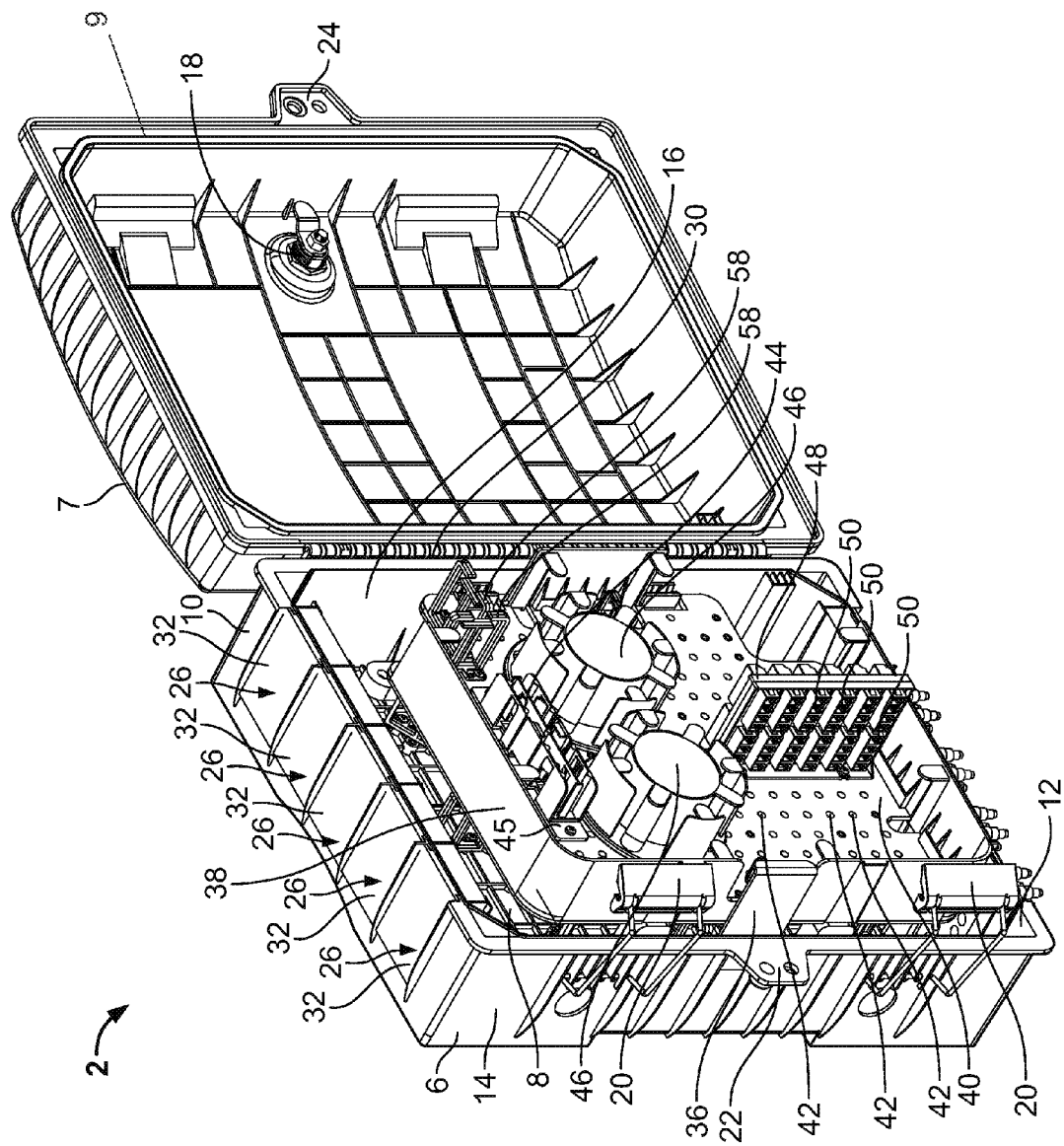
FIG. 2 is a perspective view of the fiber distribution assembly of FIG. 1 with the enclosure open.
Figure 3:
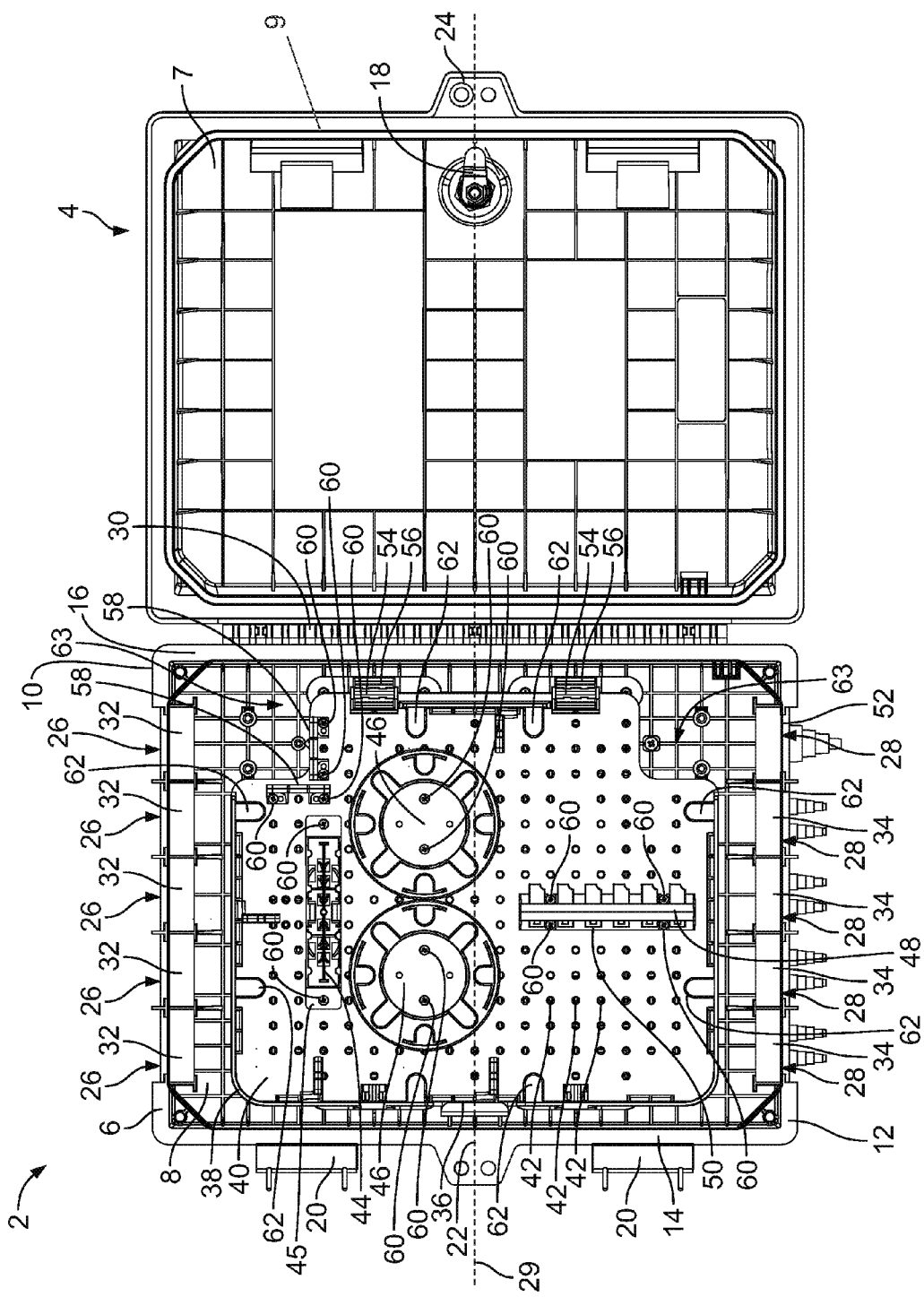
FIG. 3 is a plan view of the fiber distribution assembly of FIG. 2.
Figure 4:
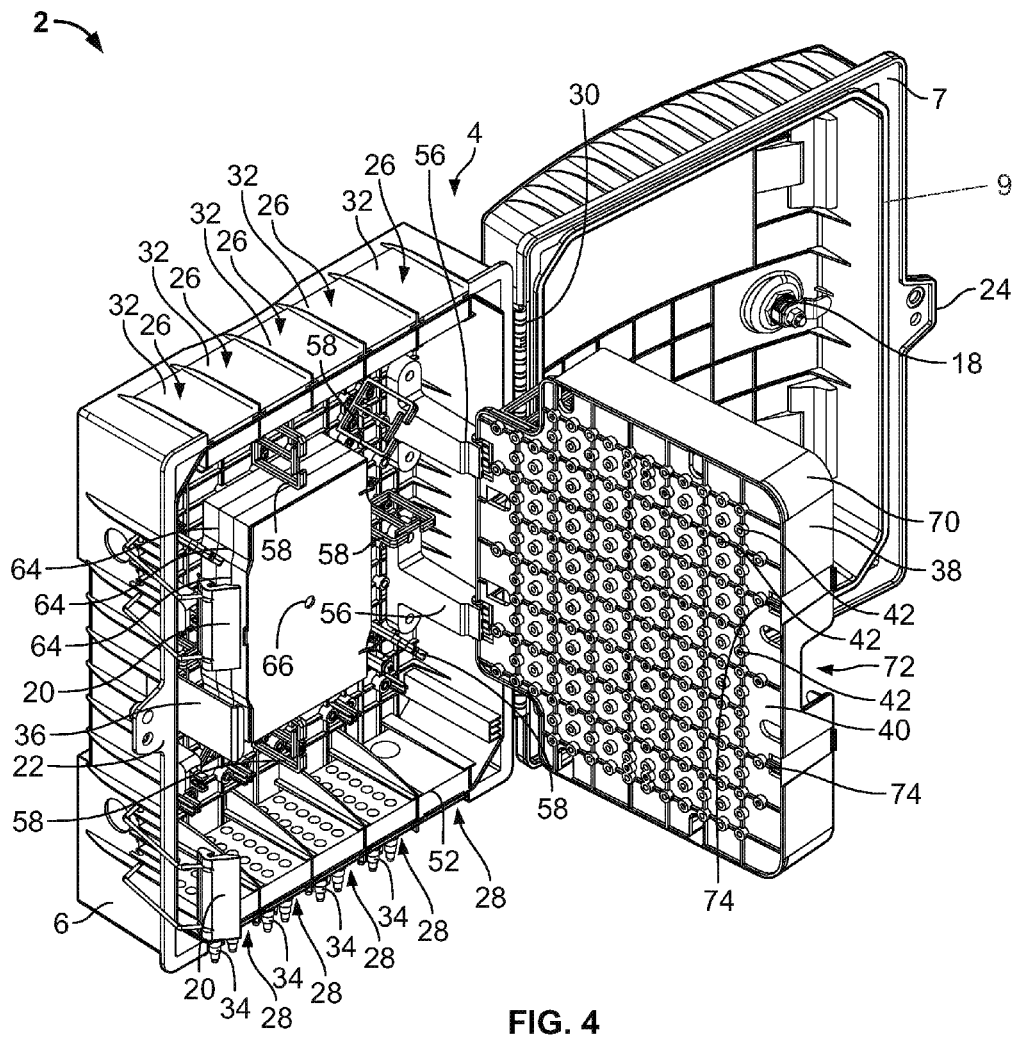
FIG. 4 is a perspective view of the fiber distribution assembly of FIGS. 1-3 with the enclosure being opened and the tray at an intermediate position.
Figure 5:
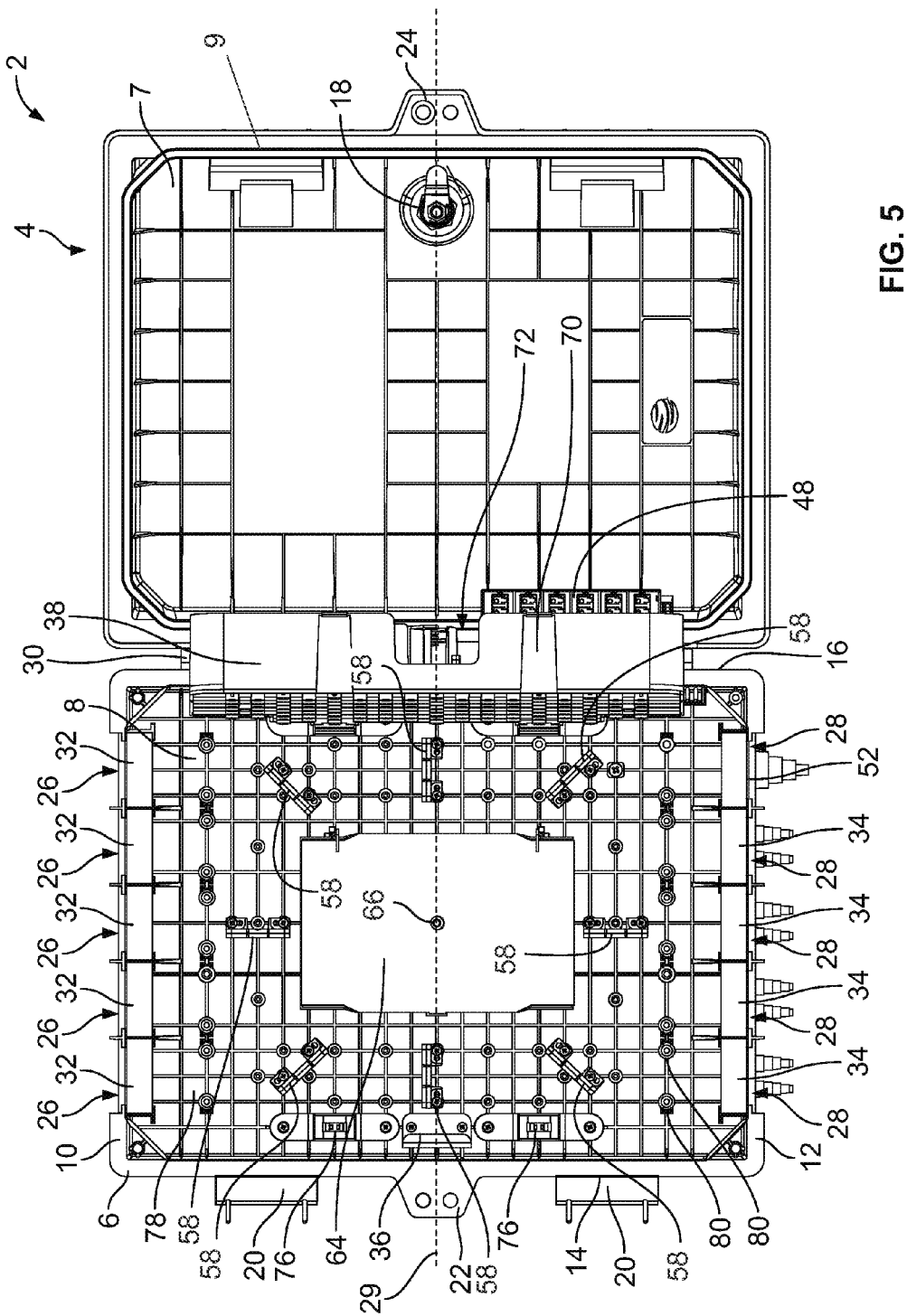
FIG. 5 is a plan view of the fiber distribution assembly of FIG. 4.

Referring collectively to FIGS. 1-6, in some embodiments, base 6 includes a main panel 8, a pair of opposing side walls 10 and 12 extending from main panel 8, and a pair of opposing side walls 14 and 16 also extending from main panel 8 between side walls 10 and 12. Side walls 10, 12, 14, and 16 collectively define, at least in part, the interior cavity of enclosure 4. Although main panel 8 is substantially rectangular as best seen in FIGS. 3 and 5, main panel 8 can have any other suitable shape.

In some embodiments, enclosure 4 includes a lock 18 that prevents cover 7 from rotating relative to base 6 when cover 7 is in the closed position as shown in FIG. 1. Lock 18 can be a tumbler lock or any other suitable locking device. Lock 18 is securely coupled to cover 7. As best seen in FIGS. 2-6, fiber distribution assembly 2 can also include a lock plate 36 securely coupled to base 6, for example, coupled to main panel 8, that is configured to cooperate with lock 18 to prevent cover 7 from rotating relative to base 6 when lock 18 is engaged with lock plate 36. As shown in FIGS. 2-6, in some embodiments, lock plate 36 is an elongated metal plate that extends from main panel 8 and has a flange at its distal end configured to engage lock 18. In some embodiments, lock 18 requires a key, combination, authenticating token, or any suitable authentication mechanism to open.

Enclosure 4 of fiber distribution assembly 2 can also include one or more clip assemblies 20. Clip assemblies 20 are configured to selectively prevent cover 7 from rotating relative to base 6 when cover 7 is in the closed position as shown in FIG. 1. Clip assemblies 20 can also be configured to apply a uniform force to cover 7 to fully engage a gasket 9 between cover 7 and base 6 to create a water-tight seal between cover 7 and base 6 when cover 7 is in the closed position as shown in FIG. 1. In some embodiments, gasket 9 can be disposed on cover 7 as shown in FIGS. 2-5, and in other embodiments, gasket 9 can be disposed on base 6. Clip assemblies 20 can be used to keep enclosure 4 closed when lock 18 is omitted or not in use. As shown in FIGS. 1-5, enclosure 4 includes two clip assemblies 20 coupled to base 6. In other embodiments, enclosure 4 includes one clip assembly 20 or more than two clip assemblies 20. As best seen in FIGS. 1 and 2, each clip assembly 20 include links that are configured to latch with a recess formed in the exterior of cover 7 to prevent cover 7 from rotating relative to base 6. Disengaging clip assemblies 20 from the recess of cover 7, allows cover 7 to rotate relative to base 6 and, thus, provide access to the interior cavity of enclosure 4.

Enclosure 4 can also be configured to use of a locking device that is separate from enclosure 4, for example, a keyed or combination pad lock, to prevent cover 7 from rotating relative to base 6 when cover 7 is in the closed position as shown in FIG. 1. For example, in some embodiments as shown in FIGS. 1-5, base 6 includes a lock flange 22 that extends outward from side wall 14. Lock flange 22 defines one or more openings configured to receive a shackle of a pad lock. Cover 7 includes a corresponding lock flange 24 that extends outward from cover 7 and defines one are more openings that are aligned with the openings of lock flange 22 of base 6 when cover 7 is in the closed position. The shackle of a pad lock can pass through the aligned holes of lock flange 22 and lock flange 24 to prevent cover 7 from rotating relative to base 6.

Fiber distribution assembly 2 can include or omit any combination of lock 18, clamp assemblies 20, and lock flanges 22 and 24, depending on the desired level of security.

Enclosure 4 defines one or more openings for receiving one or more input fiber optic cables, for example, a single fiber input distribution cable. Enclosure 4 also defines one or more openings for passing one or more output fiber optic cables, for example, single fiber drop cables. In some embodiments, base 6 defines both the opening(s) for receiving the input fiber optic cable(s), and the opening(s) for passing the output fiber optic cables. For example, as best seen in FIGS. 2-6, in some embodiments, side wall 10 of base 6 defines a plurality of openings 26, for example, five openings 26 as shown. Side wall 10 can define less than or more than five openings 26 in some embodiments. In some embodiments, side wall 10 can form channels that define openings 26. Each channel can be configured to closely and slidably receive glands (described in more detail below) for substantially sealing the respective opening 26. As best seen in FIGS. 2-6, in some embodiments, side wall 12 of base 6 defines a plurality of openings 28, for example, five openings 28 as shown. In some embodiments, side wall 12 defines more than or less than five openings 28. In some embodiments, side wall 12 can form channels that define openings 28. Each channel can be configured to closely and slidably receive glands (described in more detail below) for substantially sealing the respective opening 28. In some embodiments, each opening 26 and opening 28 has a rectangular shape as shown. In other embodiments, each opening 26 and opening 28 has a non-rectangular shape, for example, a circular shape or any other suitable non-rectangular shape. In some embodiments as shown, openings 26 and openings 28 are similarly configured (for example, same shape, size, and number).

In some embodiments as best seen in FIG. 5, main panel 8 of base 6 defines a plurality of openings 80 configured to operatively receive fasteners (for example, a bolt, a screw, an interference fit pin, a rivet, a nail, or any other suitable fastener) to releasably couple cable management, fiber optic, or enclosure components to main panel 8. Examples of cable management, fiber optic, or enclosure components that can be coupled to panel 8 include, but are not limited to, cable guides 58 (which are described in more detail below), posts 56 (which are described in more detail below), posts 76 (which are described in more detail below), lock plate 36 (which was described above), and splice closures 64. In some embodiments, base 6 is configured to house a plurality of splice closures 64. Splice closures 64 can be configured to be stacked other similarly configured splice closures 64 and secured to main panel 8 using at least one fastener 66.

In some embodiments, the walls forming openings 80 are threaded for operatively coupling with threads on fasteners 60. For example, threaded metal (or other suitable material) inserts can be inserted within openings 80. The threaded metal inserts are configured to mate with the threads on fasteners 60. In some embodiments, the threaded metal inserts can be heat-staked into base 6.

In some embodiments, enclosure 4, including base 6 and cover 7, is symmetric about a line 29 that is perpendicular to the axis about which cover 7 rotates relative to base 6 (defined by hinge 30 as shown in FIGS. 2-6). Line 29 bisects base 6 and cover 7. In some embodiments, just base 6 of enclosure 4 is symmetric. In such symmetric embodiments, openings 26 are on one side of line 29, and openings 28 are on the other side of line 29, and openings 26 and openings 28 are similarly configured such that each of openings 26 and openings 28 can closely and slidably receive a similarly constructed gland that substantially seals the respective openings. Due to this symmetric configuration of enclosure 4, fiber distribution assembly 2 can be used in a variety of applications. For example, the same fiber distribution assembly 2 can be used for both top- and bottom-cable-access applications by routing the one or more input fiber optic cables and the one or more output fiber optic cables through either openings 26 or openings 28. This symmetric configuration also allows for pass-through applications in which the one or more input fiber optic cables enter enclosure 4 through one of openings 26 or openings 28 and then exits one of the other of openings 26 and openings 28. For example, the one or more input fiber optic cables can enter enclosure 4 through one of openings 26 and then exit through one of openings 28. Likewise, the same fiber distribution assembly 2 can be used for both right- and left-hinged cover applications by simply routing the one or more input fiber optic cables and the one or more output fiber optic cables through either openings 26 or openings 28 once enclosure 4 is mounted at the desired orientation. The ability to use the same fiber distribution assembly 2 for a variety of applications helps decrease inventory costs of an installer.

Glands

Fiber distribution assembly 2 includes a plurality of a glands configured to substantially seal openings 26 and openings 28. Because openings 26 are similarly configured as openings 28, the glands that seal openings 26 can also be used to seal openings 28 and the other way around. In some embodiments as shown in FIGS. 2-6, these glands include a plurality of solid glands 32 that are not configured to pass a fiber optic cable. Solid glands 32 do not include an opening for passing a fiber optic cable. In some embodiments as shown in FIGS. 2-6, the glands include a plurality of glands configured to pass one or more fiber optic cables. For example, as shown in FIGS. 2-6, the glands configured to pass one or more fiber optic cables can include glands 34 that are configured to pass a plurality of fiber optic cables and include gland 52 that is configured to pass only one fiber optic cable. Glands 34 include a plurality of openings that allow a plurality of fiber optic cables to pass there through, and gland 52 includes a single opening that allows a single fiber optic cable to pass there through. For example, single fiber out output drop cables can pass through glands 34, and a single fiber input distribution cable can pass through gland 52. Glands 32, 34, and 52 can be made of polymer or any other suitable material for substantially sealing openings 26 and openings 28. In some embodiments, glands 32, 34, and 52 are compressible and elastic.

Figure 9B:
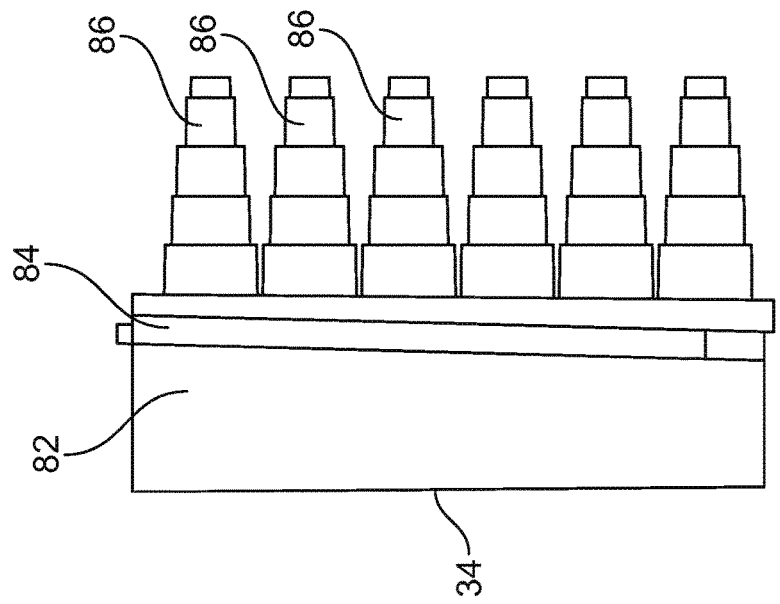
FIGS. 9A and 9B are perspective and side views, respectively, of a gland according to an embodiment.
Figure 9A:
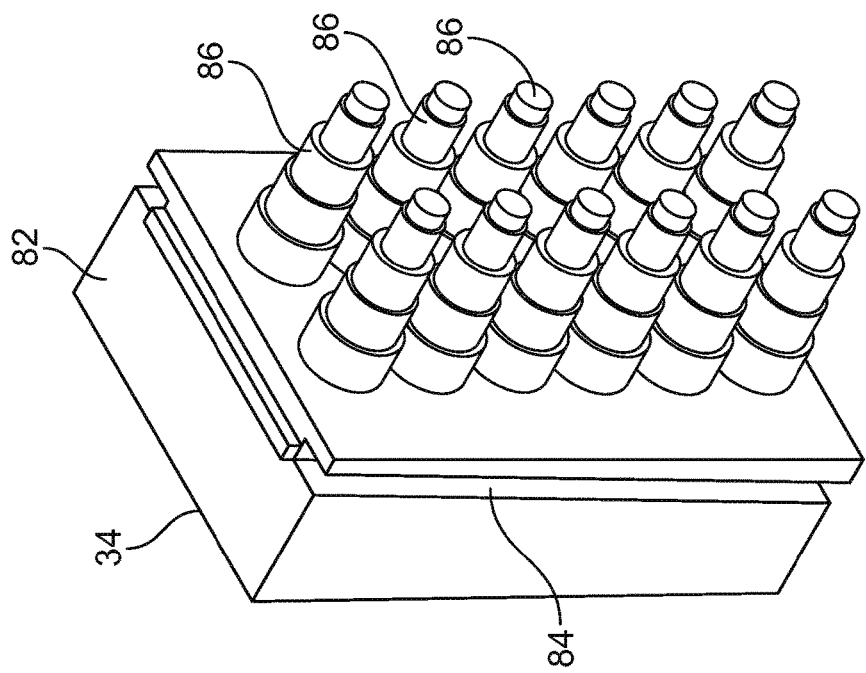

Referring to FIGS. 9A and 9B, in some embodiments, glands 34 include boots 86 through which a fiber optic cable passes. Boots 86 help prevent excessive bending of the fiber optic cables. As shown in FIGS. 9A and 9B, gland 34 includes a main body portion 82 and a plurality of boots 86 extending from main body portion 82. In some embodiments, each gland 34 can have twelve boots 86 such that twelve separate fiber optic cables can pass through a single gland 34. In other embodiments, gland 34 can have less than or more than twelve boots 86. In some embodiments, fiber distribution assembly can include glands 34 that each have a varying number of boots 86. In some embodiments as shown in FIGS. 9A and 9B, boots 86 have a decreasing diameter as boots 86 extend from main body portion 82. An installer can cut boot 86 at the length having the desired diameter such that boot 86 closely accommodates the fiber optic cable passing there through. In such embodiments, the same gland 34 can be used with a variety of different sizes of fiber optic cables.

Main body portion 82 of gland 34 can also define a groove 84 partially around the periphery of main body portion 82. Groove 84 is sized to closely accommodate an edge of side wall 10 or side wall 12 that defines openings 26 or openings 28, respectively, when gland 34 is inserted within either opening 26 or opening 28. The engagement between groove 84 of gland 34 and the edge of side wall 10 or side wall 12 helps maintain gland 34 in place. Main body portion 82 can be sized to be closely and slidably received within the channel of side wall 10 and side wall 12 that defines openings 26 and openings 28.

In some embodiments, gland 52 is constructed similar to gland 34 as shown in FIGS. 9A and 9B except that gland 52 only includes a single boot 86.

In some embodiments, solid gland 32 is constructed similarly to gland 34 as shown in FIGS. 9A and 9B except without any boots. The main body portion 82 of gland 34 is solid and defines groove 84.

Rotatable Tray

As shown in FIGS. 2-5, fiber distribution assembly 2 also includes a tray 38 rotatably coupled to the enclosure within the interior cavity of enclosure 4. Tray 38 is configured such that an installer can releasably couple one or more cable management or fiber optic components thereto. FIGS. 2-4, 7, and 8 illustrate an embodiment of tray 38. Examples of cable management or fiber optic components that can be releasably coupled to tray 38 include, but are not limited to, a holder 44 configured to retain an optical splitter (not illustrated) or any other suitable fiber optic device (for example, fanout device, a tap module, a wavelength division multiplexer module, and a coupler module), a cable management spool 46, an adapter plate 48 configured to retain one or more adapters 50, a cable guide 58, or any other suitably configured cable management or fiber optic component. Splitter holder 44, cable management spool 46, adapter plate 48, and cable guide 58 are described in more detail below. Tray 38 can be made of plastic, metal, or any other suitable material.

In some embodiments, tray 38 is rotatably coupled to base 6, as described in more detail below, and is spaced apart from main panel 8 of base 6 such that fiber optic cables entering through either openings 26 or openings 28 are between main panel 8 and tray 38. Tray 38 is configured to rotate between a closed position as shown in FIGS. 2 and 3 and an opened position. FIGS. 4 and 5 illustrate tray 38 at an intermediate position between the opened position and the closed position.

Tray 38 includes a panel 40. At the closed position, panel 40 is substantially parallel to main panel 8 of base 6. In some embodiments, the surface of panel 40 facing the opening of enclosure 4 when cover 7 is at the opened position—the surface facing away from main panel 8 of base 6—defines a plurality of openings 42. Each opening 42 is configured to operatively receive a fastener 60 (for example, a bolt, a screw, an interference fit pin, a rivet, a nail, or any other suitable fastener) that releasably couples the cable management or fiber optic components to panel 40 of tray 38. In some embodiments, openings 42 are through holes that extend through the entire depth of panel 40. In other embodiments, openings 42 are openings that extend only partially through the depth of panel 40.

In some embodiments, the walls forming openings 42 are threaded for operatively coupling with threads on fasteners 60. For example, internally threaded metal (or other suitable material) inserts can be inserted within openings 42. The threaded metal inserts are configured to mate with the threads on fasteners 60. In some embodiments, the threaded metal inserts can be heat-staked into panel 40.

In some embodiments, openings 42 are uniformly spaced on panel 40. For example, openings 42 can form a two-dimensional grid pattern as shown in FIGS. 2-4, 7, and 8. In some embodiments, the grid pattern forms squares having a dimension ranging from about 1 cm to about 5 cm. In other embodiments, the grid pattern forms squares having a dimension smaller than about 1 cm or larger than about 5 cm. In some embodiments, as shown in FIGS. 2-4, 7, and 8, panel 40 can include openings 42 over a substantial majority of its surface.

Tray 38 can also include a side wall 70 that extends substantially perpendicular to panel 40 along at least a portion of the periphery of panel 40 and away from main panel 8 of base 6. Side wall 70 helps retain fiber optic cables within the periphery of panel 40 for efficient and compact cable storage. In some embodiments, tray 38 also includes a plurality of retaining tabs 62 that extend inward from the distal edge of side wall 70. Retaining tabs 62 help maintain fiber optic cables within the space defined by panel 40 and side wall 70 for efficient and compact cable storage.

Figure 7:
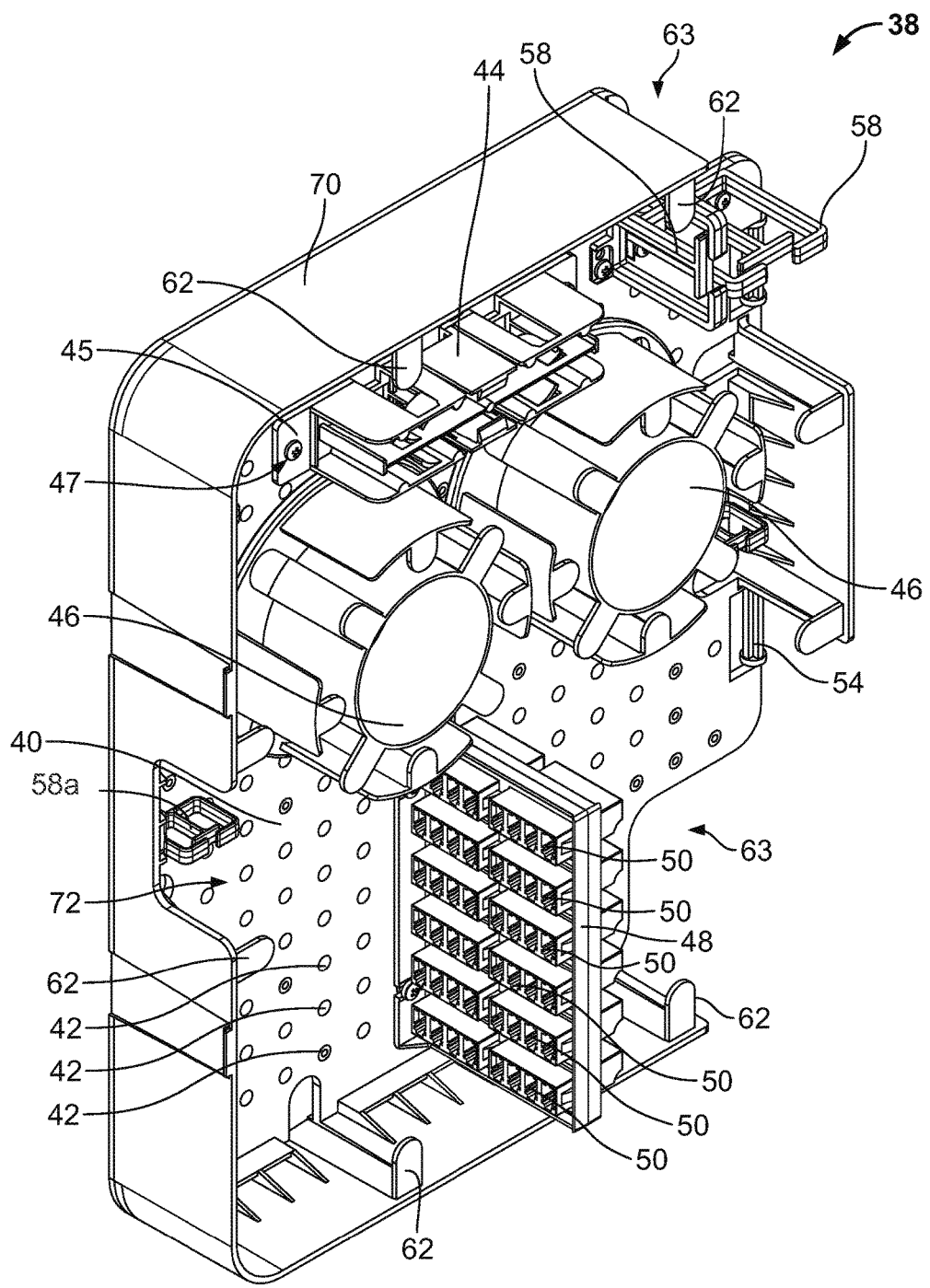
FIG. 7 is a perspective view of the tray shown in FIGS. 1-5.
Figure 8:
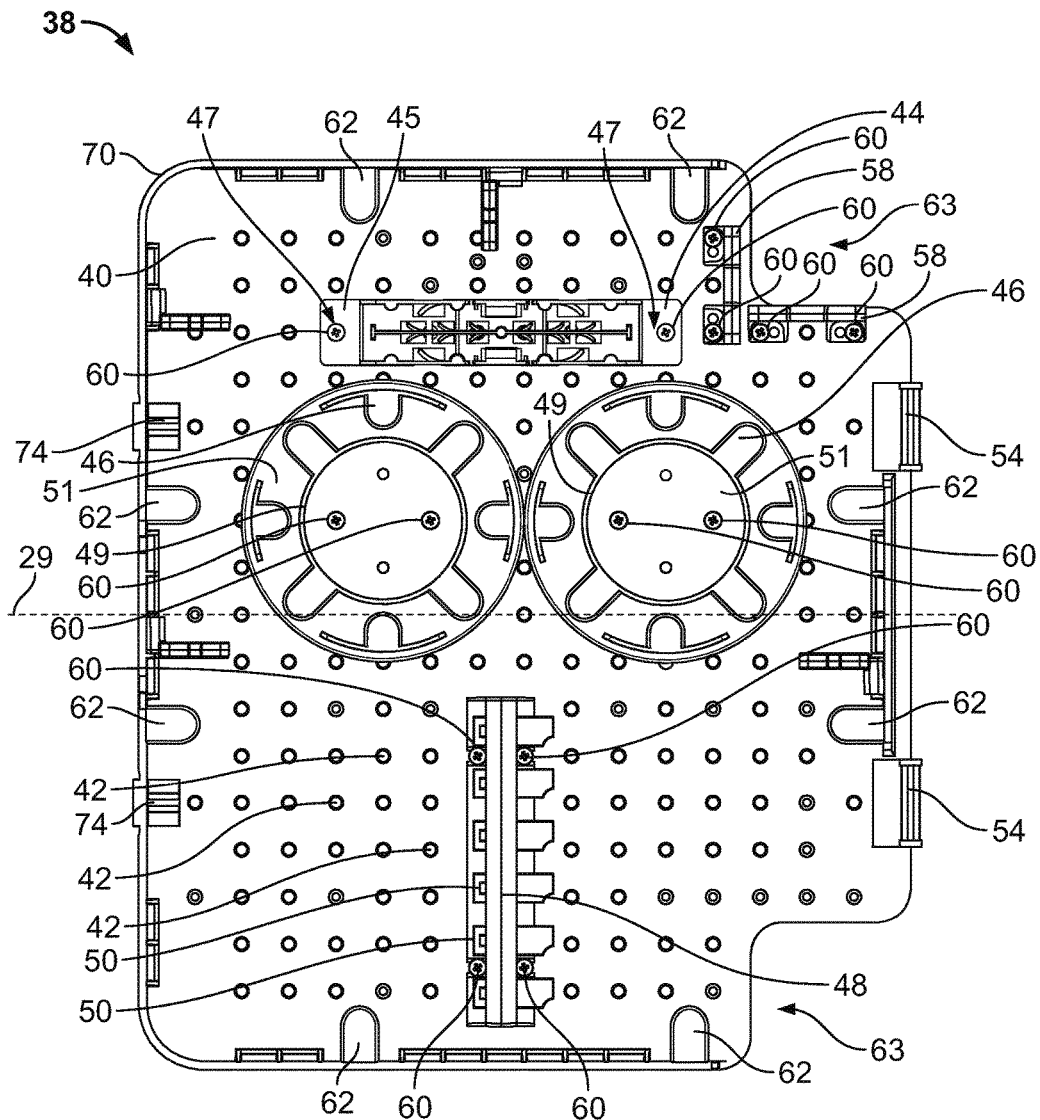
FIG. 8 is a plan view of the tray in FIG. 7.

As best seen in FIGS. 3, 7, and 8, panel 40 can also define a pair of recessed notches 63 at its periphery. Notches 63 allow fiber optic cables to easily pass from the volume between panel 40 of tray 38 and main panel 8 of base 6 to the front side of panel 40. Notches 63 can have any suitable shape, for example, a rectangular shape as shown in FIGS. 3, 7, and 8, a semi-circular shape, or any other suitable shape.

Figure 6:
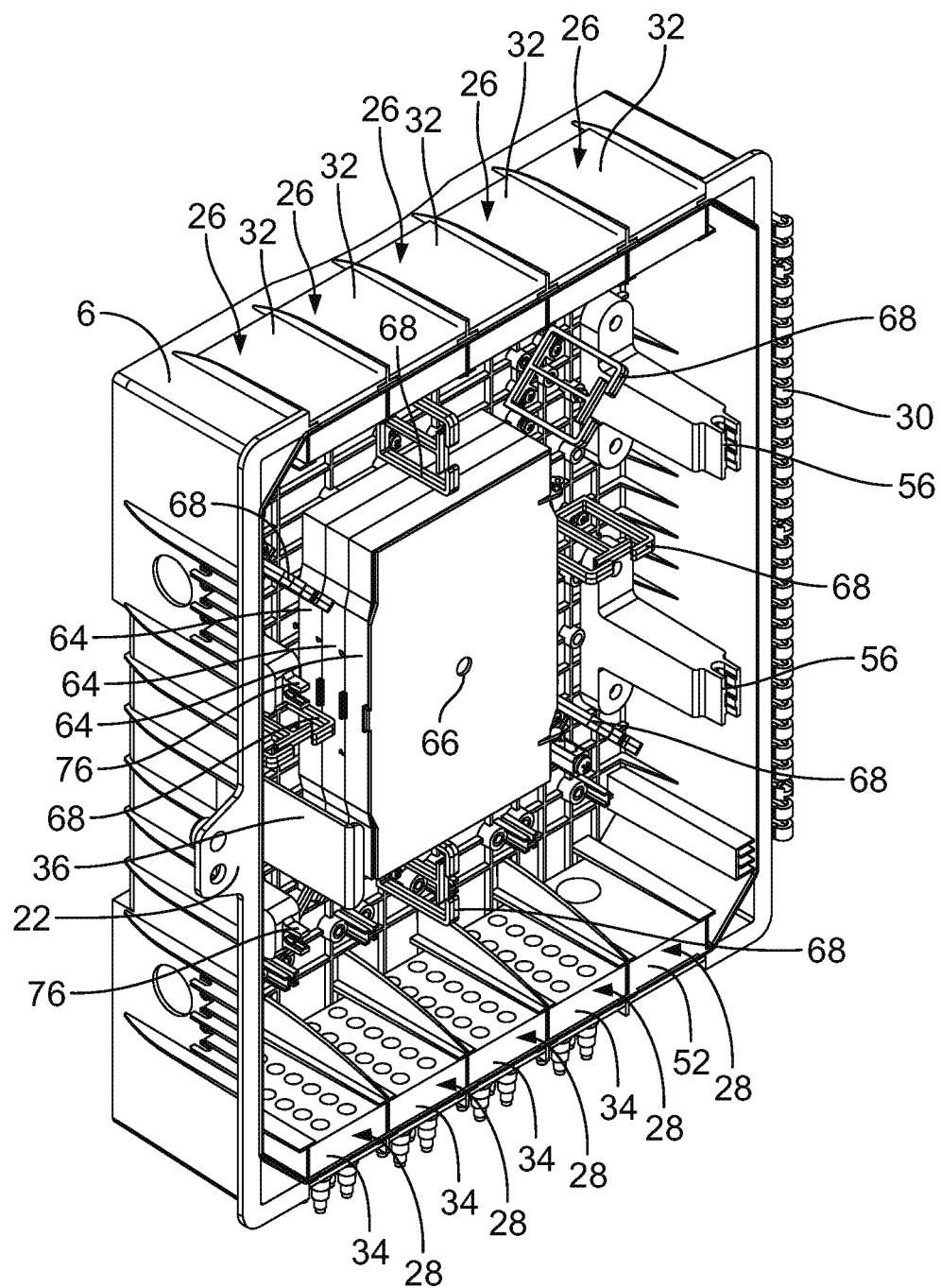
FIG. 6 is a perspective view of a base of the enclosure of the fiber distribution assembly of FIGS. 1-5 with the cover of the enclosure and the tray being removed.

Tray 38 is rotatably coupled to enclosure 4. In some embodiments, tray 38 includes one or more pivot pins 54 as best seen in FIG. 8. As shown in FIG. 8, tray 38 includes two pivot pins 54 that are formed in the same plane as panel 40. Pivot pins 54 rotatably couple with corresponding posts 56 (best seen in FIGS. 3, 4, and 6) that define channels that rotatably and operatively receive pivot pins 54. As best seen in FIG. 6, two posts 56 extend from main panel 8 of base 6. In other embodiments, tray 38 includes less than or more than two pivot pins 54, and fiber distribution assembly 2 includes a corresponding number of posts 56 for rotatably coupling with pivot pins 54.

In some embodiments, tray 38 is configured to be releasably coupled to enclosure 4 such that tray 38 can be selectively removed, temporarily or permanently, from enclosure 4. For example, an installer may temporarily remove tray 38 from enclosure 4 to facilitate better access to base 6 during initial installation, and then tray 38 can be recoupled to enclosure 38 afterwards. Depending on the application, an installer may want to permanently remove tray 38 from enclosure 4. In some embodiments, pivot pins 54 are configured to create a releasable interference fit with the channels defined by posts 56 such that tray 38 can be releasably coupled to enclosure 4.

In some embodiments, tray 38 is configured to be selectively locked in the closed position as shown in FIGS. 2 and 3. Tray 38 can include one or more retention pins 74. As shown in FIG. 8, tray 38 includes two retention pins 74 that are formed in the same plane as panel 40. Retention pins 74 are sized and shaped to create an interference fit with a channel defined by corresponding posts 76, which are best seen in FIGS. 5 and 6. Posts 76 extend from main panel 8 of base 6. When tray 38 is in the closed position, retention pins 74 are firmly received within channels defined by posts 76, maintaining tray 38 in the closed position. Posts 76 and retention pins 74 are configured such that an installer can easily disengage retention pins 74 from posts 76 by pulling tray 38 away from main panel 8 of base 6.

In some embodiments, tray 38, including openings 42 defined by panel 40 and notches 63, is symmetric about line 29, which is perpendicular to the axis about which cover 7 rotates relative to base 6 (and the axis about which tray 38 rotates). Line 29 also bisects tray 38. This symmetric configuration of tray 38, in combination with the openings 42 being configured to releasably receive a fastener, allow the same fiber distribution assembly 2 to be used for a variety of applications. For example, the same fiber distribution assembly 2 can be used for both top- and bottom-cable-access applications by simply adjusting the position of the cable management or fiber optic components on panel 40 such that the cable management or fiber optic components are properly positioned for the desired application. Likewise, the same fiber distribution assembly 2 can be used for both right- and left-hinged cover applications by simply adjusting the position of the couple cable management or fiber optic components on panel 40. Being able to use the same fiber distribution assembly 2 for a variety of applications can help an installer decrease its inventory costs. In some embodiments, enclosure 4 and tray 38 are both symmetric. In some embodiments, either enclosure 4 or tray 38 is symmetric. And in some embodiments, neither enclosure 4 nor tray 38 is symmetric.

In some embodiments, openings 80 are uniformly spaced on base 6 to match the spacing of openings 42 of tray 38. For example, openings 80 can form a two-dimensional grid pattern that matches the grid pattern of openings 42 as shown in FIGS. 2-4, 7, and 8. Accordingly, the same cable management or fiber optic components that can be releasably coupled to tray 38 can also be releasably coupled to base 6.

Cable Management and Fiber Optic Components

Fiber distribution assembly 2 includes one or more cable management or fiber optic components that are configured to be releasably coupled to tray 38. Because the one or more cable management or fiber optic components are configured to be releasably coupled to tray 38, an installer can easily configure fiber distribution assembly 2 depending on the particular application such that the same fiber distribution assembly can be used in a variety of FTTx applications. For example, an installer can easily position the one or more cable management or fiber optic components on tray 38 as desired in the field or at the installer's facility based on the application. In some embodiments, the one or more cable management or fiber optic components include at least two different types of cable management or fiber optic components.

In some embodiments, the one or more cable management or fiber optic components are configured to be releasably coupled to tray 38 such that an installer can also readjust the position of the one or more cable management or fiber optic components on tray 38 if needed after the one or more cable management or fiber optic components have been initially coupled to tray 38. That is, the components can be uncoupled from tray 38 and then recoupled to tray 38.

Fiber distribution assembly 2 can include any combination or number of the following cable management or fiber optic components: splitter holder 44 that is configured to retain an optical splitter (not illustrated), cable management spool 46, adapter plate 48 that is configured to retain one or more adapters 50, or cable guide 58. In some embodiments, each of the cable management or fiber optic components that are releasably coupled to tray 38 either (1) define a plurality of openings that are spaced to match the spacing of openings 42 of panel 40 and that are configured to receive fasteners 60 that operatively engage respective openings 42 of panel 40 to releasably secure the cable management or fiber optic component to tray 38, or (2) includes a plurality of integral interference fit pins that are spaced to match the spacing of openings 42 of panel 40 and that are configured to operatively engage openings 42 to releasably secure the cable management or fiber optic component to tray 38. In some embodiments, fiber distribution assembly 2 can include at least two different types of components from the following cable management or fiber optic components: splitter holder 44, cable management spool 46, adapter plate 48, and cable guide 58. That is in some embodiments, fiber distribution assembly 2 includes a plurality of releasably coupled components that are not the same type of component. These features are further described with respect to specific exemplary cable management or fiber optic components below.

As best seen in FIGS. 2, 3, 7, and 8, fiber distribution assembly 2 includes at least one splitter holder 44 configured to retain an optical splitter. Holder 44 include a base 45 configured to be coupled adjacent to and, in some embodiments, flush with panel 40 of tray 38. Base 45 of holder 44 defines a plurality of openings 47 that are spaced to match the spacing of openings 42 defined in panel 40 of tray 38. Base 45 is planar. Accordingly, when one opening 47 of holder 44 is aligned with one opening 42 of panel 40, the other openings 47 of holder 44 can be aligned with other openings 42 of panel 40. When openings 47 and openings 42 are aligned, fasteners 60 can pass through openings 47 and operatively engage openings 42 of panel 40 to releasably secure holder 44 to tray 38. In some alternative embodiments, instead of base 45 defining openings 47 for receiving fasteners 60, base 45 includes a plurality of integral fasteners, for example, interference fit pins, that extend from base 45 and that are spaced to match the spacing of openings 42 of panel 40 to operatively engage openings 42 of panel 40 to create the interference fit, which releasably couples holder 44 to tray 38.

Figure 10B:
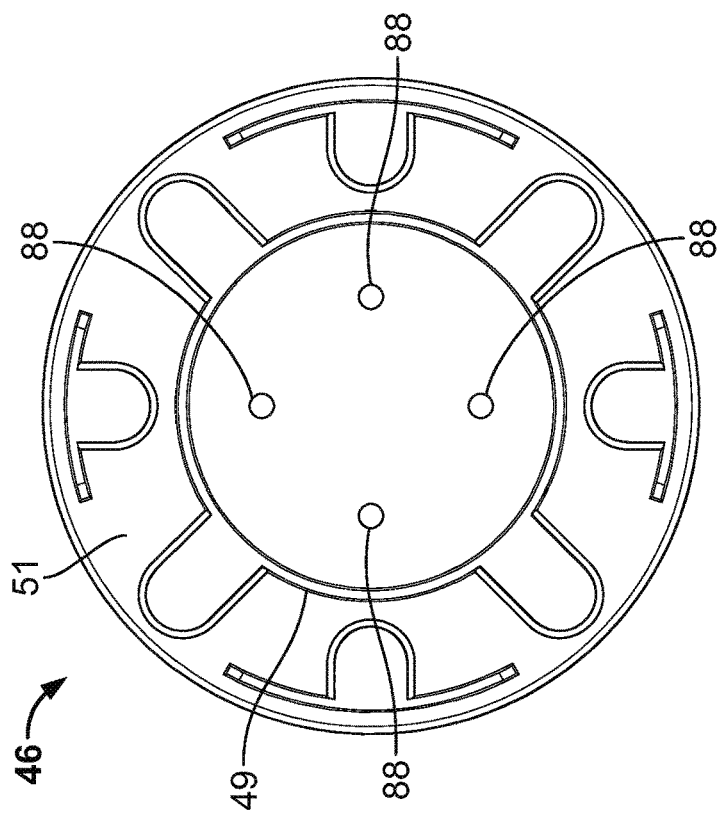
FIGS. 10A and 10B are perspective and plan views, respectively, of a cable management spool according to an embodiment.
Figure 10A:
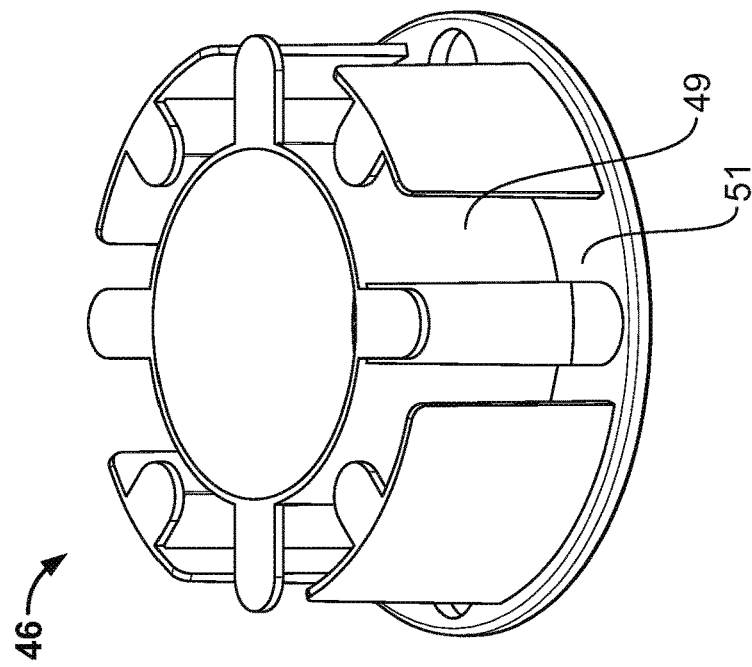

As shown in FIGS. 2, 3, 7, and 8, fiber distribution assembly 2 includes one or more cable management spools 46. FIGS. 10A and 10B illustrate one embodiment of cable management spool 46. Cable management spool 46 includes a cylindrical portion 49 configured to store excess slack of fiber optic cables contained within enclosure 4. Cable management spool 46 includes a base 51 configured to be coupled adjacent to and, in some embodiments, flush with panel 40 of tray 38. Base 51 of cable management spool 46 defines a plurality of openings 88 that are spaced to match the spacing of openings 42 defined in panel 40 of tray 38. Base 51 is planar. Accordingly, when one opening 88 of cable management spool 46 is aligned with one opening 42 of panel 40, the other openings 88 of cable management spool 46 can be aligned with other openings 42 of panel 40. When openings 88 and openings 42 are aligned, fasteners 60 can pass through openings 88 and operatively engage openings 42 of panel 40 to releasably secure cable management spool 46 to tray 38. In some alternative embodiments, instead of base 51 defining openings 88 for receiving fasteners 60, base 51 includes a plurality of integral fasteners, for example, interference fit pins, that extend from base 51 and that are spaced to match the spacing of openings 42 of panel 40 to operatively engage openings 42 of panel 40 to create the interference fit, which releasably couples cable management spool 46 to tray 38.

Figure 11:
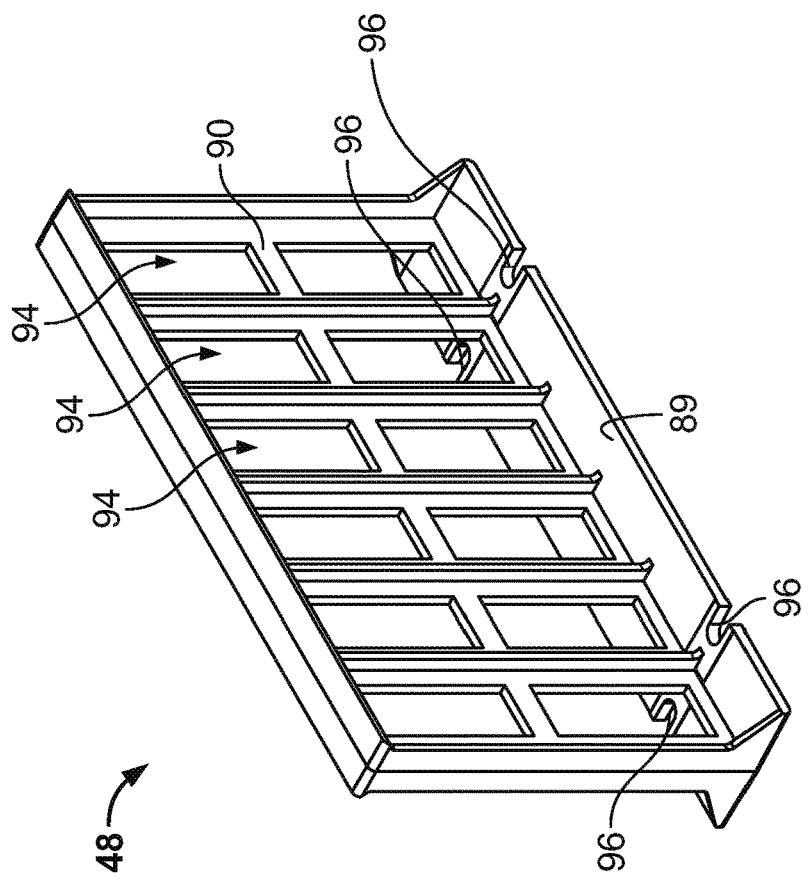
FIG. 11 is a perspective view of an adapter plate without adapters according to an embodiment.

Fiber distribution assembly 2 can include one or more cable adapter plates 48 that are configured to hold one or more adapters 50. FIG. 11 illustrates one embodiment of adapter plate 48 without adapters 50 coupled thereto. Adapter plate 48 includes a base 89 configured to be coupled adjacent to and, in some embodiments, flush with panel 40 of tray 38. Base 89 of adapter plate 48 defines a plurality of openings 96 that are spaced to match the spacing of openings 42 defined in panel 40 of tray 38. Base 89 is planar. Accordingly, when one opening 96 of adapter plate 48 is aligned with one opening 42 of panel 40, the other openings 96 of adapter plate 48 can be aligned with other openings 42 of panel 40. When openings 96 and openings 42 are aligned, fasteners 60 can pass through openings 96 and operatively engage openings 42 of panel 40 to releasably secure adapter plate 48 to tray 38. In some alternative embodiments, instead of base 89 defining openings 96 for receiving fasteners 60, base 89 includes a plurality of integral fasteners, for example, interference fit pins, that extend from base 89 and that are spaced to match the spacing of openings 42 of panel 40 to operatively engage openings 42 of panel 40 to create the interference fit, which releasably couples adapter plate 48 to tray 38. Adapter plate 48 also includes a vertical panel 90 extending from base 89. Vertical panel 90 defines a plurality of openings 94 configured to securely receive adapters 50 (not shown in FIG. 11) either individually or as a pack. In some embodiments, adapter plate 48 is configured to hold up to 48 adapters. In other embodiments, adapter plate 48 is configured to hold more than 50 adapters.

Figure 12:
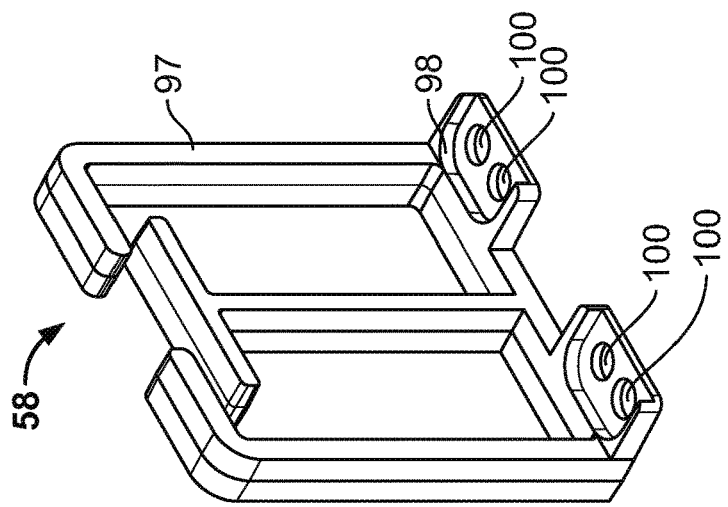
FIG. 12 is a perspective view of a cable guide according to an embodiment.

Fiber distribution assembly 2 can include one or more cable guides 58 that are configured to retain one or more fiber optic cables close to the surface to which cable guides 58 are mounted. FIG. 12 illustrates one embodiment of cable guide 58. Cable guide 58 includes a base 98 configured to be coupled adjacent to and, in some embodiments, flush with panel 40 of tray 38. Base 98 is planar. Base 98 of cable guide 58 defines a plurality of openings 100 that are spaced to match the spacing of openings 42 defined in panel 40 of tray 38. Accordingly, when one opening 100 of cable guide 58 is aligned with one opening 42 of panel 40, at least one other opening 100 of cable guide 58 can be aligned with other openings 42 of panel 40.

In some embodiments, cable guide 58 can have four openings 100 as shown in FIG. 12—two opposing pair of openings 100. In some embodiments, when one opening 100 is aligned with one opening 42 of panel 40 only one of the opposing pair of openings 100 is aligned with another opening 42. Openings 100 can be spaced such that cable guide 58 can be installed at different angles relative base 6. Referring to FIG. 5, in some embodiments, openings 100 can be spaced such that cable guides 58 can be coupled to base 6, for example, at angles perpendicular, parallel, and at 45 degree angles relative to line 29. When cable guides 58 are coupled at angles perpendicular or parallel to line 29, outer openings 100 of each pair are aligned with openings 42, and when cable guides 58 are coupled to base 6 at 45 degree angles relative to line 29, inner openings 100 of each pair are aligned with openings 42.

When openings 100 and openings 42 are aligned, fasteners 60 can pass through openings 100 and operatively engage openings 42 of panel 40 to releasably secure cable guide 58 to tray 38. In some alternative embodiments, instead of base 98 defining openings 100 for receiving fasteners 60, base 98 includes a plurality of integral fasteners, for example, interference fit pins, that extend from base 98 and that are spaced to match the spacing of openings 42 of panel 40 to operatively engage openings 42 of panel 40 to create an interference fit, which releasably couples cable guide 58 to tray 38. Cable guide 58 also includes a cable retaining arm structure 97 that is configured to releasably retain one or more fiber optic cables close to the surface of panel 40 to which cable guide 58 is mounted. Arm structure 97 is configured to surround the one or more fiber optic cables.

In some embodiments, instead of using openings and fasteners to couple the cable guides to base 6 or tray 38, the cable guides are configured to be pressed fit into slots formed into base 6 or tray 38. For example, as shown in FIG. 7, cable guide 58a is configured to be pressed fit into a slot formed the side wall panel of tray 38.

Because each of the cable management or fiber optic components that is releasably releasably coupled to panel 40 of tray 38—for example, splitter holder 44, cable management spool 46, adapter plate 48, and cable guide 58—either (1) defines a plurality of openings that are spaced to match the spacing of openings 42 of panel 40 for receiving fasteners or (2) includes integral fasteners that are spaced to match openings 42, an installer can releasably couple these components to tray 38 as desired, providing flexibility to use fiber distribution assembly 2 in a variety of applications. That us, the installer can easily customize the configuration of the cable management or fiber optic components within enclosure 4 simply by aligning the openings or integral fasteners of the component with the openings 42 of panel 40 of tray 38.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A fiber distribution assembly comprising:
    an enclosure defining an interior cavity and comprising:
        a base defining a first opening and a second opening; and
        a cover rotatably coupled to the base and configured to rotate about an axis;
        a tray rotatably coupled to the enclosure within the interior cavity, and comprising a panel defining a plurality of uniformly spaced openings; and
    a plurality of cable management or fiber optic components each configured to be releasably coupled to the tray at a plurality of different angular orientations relative to the tray, wherein the plurality of cable management or fiber optic components comprises at least two different types of cable management or fiber optic components,
    wherein the plurality of cable management or fiber optic components and the plurality of uniformly spaced openings are configured such that each of the plurality of cable management or fiber optic components can be releasably coupled to the tray at a plurality of different angular orientations relative to the tray.

2. The fiber distribution assembly of claim 1, further comprising:
    a solid gland configured to selectively seal the first opening and the second opening; and
    a gland configured to pass a fiber optic cable and to selectively seal the first opening and the second opening.

3. The fiber distribution assembly of claim 2, wherein the gland configured to pass the fiber optic cable is further configured to pass a plurality of fiber optic cables.

4. The fiber distribution assembly of claim 3, further comprising a gland configured to pass only a single fiber optic cable and to selectively seal the first opening and the second opening.

5. The fiber distribution assembly of claim 2, wherein the base further defines a plurality of first openings and a plurality of second openings; and
    the fiber distribution assembly further comprising
        a plurality of solid glands each configured to selectively seal one of the plurality of first openings and one of the plurality of second openings; and
        a plurality of glands each configured to a pass fiber optic cable and to selectively seal one of the plurality of first openings and one of the plurality of second openings.

6. The fiber distribution assembly of claim 1, wherein the at least two different types of cable management or fiber optic components comprises a first type comprising at least one of a cable management spool and a cable guide, and a second type comprising at least one of a splitter holder and an adapter plate.

7. The fiber distribution assembly of claim 1, further comprising a plurality of cable management or fiber optic components configured to be releasably coupled to the tray.

8. The fiber distribution assembly of claim 1, wherein each of the plurality of cable management or fiber optic components comprises a base, wherein the base is configured to be coupled adjacent to the panel of the tray and defines a plurality of openings spaced to match the spacing of the plurality of uniformly spaced openings of the panel of the tray; and
    the fiber distribution assembly further comprising a plurality of fasteners configured to pass through the plurality of openings of the plurality of cable management or fiber optic components and operatively engage respective openings of the plurality of uniformly spaced openings of the panel of the tray to releasably couple the plurality of cable management or fiber optic components to the tray.

9. The fiber distribution assembly of claim 1, wherein each of the plurality of cable management or fiber optic components comprises a base configured to be coupled adjacent to the panel of the tray and a plurality of interference fit pins extending from the base and spaced to match the spacing of the plurality of uniformly spaced openings of the panel of the tray; and wherein the plurality of interference fit pins are configured to operatively engage respective openings of the plurality of uniformly spaced openings of the panel of the tray to create an interference fit that releasably couples the plurality of cable management or fiber optic components to the tray.

10. The fiber distribution assembly of claim 1, wherein the plurality of uniformly spaced openings of the panel of the tray form a two-dimensional grid pattern.

11. The fiber distribution assembly of claim 1, wherein the plurality of cable management or fiber optic components comprises at least one of the group consisting of a cable management spool, a cable guide, a splitter holder, and an adapter plate.

12. The fiber distribution assembly of claim 1, wherein the base defines a plurality of uniformly spaced openings that match the spacing of the plurality of uniformly spaced openings defined in the panel of the tray.

13. The fiber distribution assembly of claim 1, wherein the base comprises a main panel, opposing first and second side walls extending from the main panel, and opposing third and fourth side walls extending from the base panel between the first and second side walls;

wherein the first wall defines the first opening; and wherein the second wall defines the second opening.

14. The fiber distribution assembly of claim 1, wherein the tray is releasably coupled to the enclosure.

15. A fiber distribution assembly comprising:

an enclosure defining an interior cavity;

a tray rotatably coupled to the enclosure within the interior cavity of the enclosure and comprising a panel defining a plurality of uniformly spaced openings;

a plurality of cable management or fiber optic components, each comprising a base configured to be coupled adjacent to the panel of the tray and defining a plurality of openings spaced to match the spacing of the plurality of uniformly spaced openings of the panel of the tray, wherein the plurality of cable management or fiber optic components comprises at least two different types of cable management or fiber optic components; and a plurality of fasteners configured to pass through the plurality of openings of the plurality of cable management or fiber optic components and operatively engage respective openings of the plurality of uniformly spaced openings of the panel of the tray to releasably couple the plurality of cable management or fiber optic components to the tray, wherein the plurality of cable management or fiber optic components and the plurality of uniformly spaced openings are configured such that each of the plurality of cable management or fiber optic components can be releasably coupled to the tray at a plurality of different angular orientations relative to the tray.

16. The fiber distribution assembly of claim 15, wherein the plurality of uniformly spaced openings of the tray form a two-dimensional grid pattern.

17. The fiber distribution assembly of claim 15, wherein the plurality of cable management or fiber optic components comprise at least one of the group consisting of a cable management spool, a cable guide, a splitter holder, and an adapter plate.

18. The fiber distribution assembly of claim 15, wherein the enclosure comprises a base and a cover rotatably coupled to the base that rotates about an axis; and wherein the base and the tray are symmetric about a line perpendicular to the axis.

19. A fiber distribution assembly comprising:

an enclosure defining an interior cavity;

a tray rotatably coupled to the enclosure within the interior cavity of the enclosure and comprising a panel defining a plurality of uniformly spaced openings; and a plurality of cable management or fiber optic components, each comprising a base configured to be coupled adjacent to the panel of the tray and a plurality of interference fit pins extending from the base and spaced to match the spacing of the plurality of uniformly spaced openings of the panel of the tray and configured to operatively engage respective openings of the plurality of uniformly spaced openings of the panel of the tray to create an interference fit that releasably couples the plurality of cable management or fiber optic components to the tray, wherein the plurality of cable management or fiber optic components comprises at least two different types of cable management or fiber optic components, and wherein the plurality of cable management or fiber optic components and the plurality of uniformly spaced openings are configured such that each of the plurality of cable management or fiber optic components can be releasably coupled to the tray at a plurality of different angular orientations relative to the tray.

20. The fiber distribution assembly of claim 19, wherein the plurality of uniformly spaced openings of the tray form a two-dimensional grid pattern.

21. The fiber distribution assembly of claim 19, wherein the plurality of cable management or fiber optic components comprises at least one of the group consisting of a cable management spool, a cable guide, a splitter holder, and an adapter plate.

22. The fiber distribution assembly of claim 19, wherein the enclosure comprises a base and a cover rotatably coupled to the base that rotates about an axis; and wherein the base and the tray are symmetric about a line perpendicular to the axis.

23. The fiber distribution assembly of claim 1, wherein:

the base is symmetric about a line perpendicular to the axis;

the first opening is on one side of the line;

the second opening is on the other side of the line; and the tray is symmetric about the line.

24. The fiber distribution assembly of claim 15, wherein the enclosure comprises:

a base defining a second plurality of openings spaced to match the spacing of the plurality of openings of each base of at least one type of the plurality of cable management or fiber optic components; and a cover rotatably coupled to the base of the enclosure.

\* \* \* \* \*

UNITED STATES PATENT AND TRADEMARK OFFICE
CERTIFICATE OF CORRECTION

PATENT NO.       : 10,031,306 B2
APPLICATION NO.  : 14/633599
DATED            : July 24, 2018
INVENTOR(S)      : Sadasivan et al.

Page 1 of 1

It is certified that error appears in the above-identified patent and that said Letters Patent is hereby corrected as shown below:

Column 14, Line 37, Claim 5, "to a pass" should be --to pass a--.

Signed and Sealed this
Eleventh Day of December, 2018

Andrei Iancu
*Director of the United States Patent and Trademark Office*